INVENTORS
LEE P. STEPHENSON
WALTER W. KLEIN
ATTORNEYS

Sept. 13, 1966   L. P. STEPHENSON ETAL   3,273,114
ERGODIC SIGNAL PICKING

Filed Aug. 2, 1963   5 Sheets-Sheet 5

INVENTORS
LEE P. STEPHENSON
WALTER W. KLEIN
BY *P E Johnston*
*George W. Wasson*
ATTORNEYS

United States Patent Office 3,273,114
Patented Sept. 13, 1966

3,273,114
ERGODIC SIGNAL PICKING
Lee P. Stephenson and Walter W. Klein, Fullerton, Calif., assignors to Chevron Research Company, a corporation of Delaware
Filed Aug. 2, 1963, Ser. No. 299,601
12 Claims. (Cl. 340—15.5)

This invention relates to seismic data processing and more particularly to the processing of seismic data to identify reflection signals within multitrace seismic records.

A seismic record is a multitrace recording of the movement of the earth's surface in response to reflected and refracted energy from subsurface formations. The movements are detected by geophones placed in contact with the earth's surface, each geophone producing the signal for one trace of the multitrace record.

In the art of seismic data processing many schemes have been employed to distinguish meaningful signals, which represent subsurface interfaces, from unmeaningful noise. In the case of printed records, meaningful signals, called "events," can frequently be identified by visual inspection. Seismologists call the identification of events "picking." Since the development of reliable magnetic recording systems, most seismic records have been made on magnetic tape to be reproduced later for signal analysis. In recent years automatic processes have been developed that attempt to supplement and accelerate the procedures performed by the seismologist in his visual picking of events within the printed record. These automatic processes depend to a large extent on the rapid reproducibility of magnetic records.

An example of an automatic record picking process is described in the copending application of Walter W. Klein and Lee P. Stephenson, Serial No. 842,621, filed September 28, 1959 on an Information Selection Programmer, now U.S. Patent 3,149,302, issued September 15, 1964. In that application a process is described wherein the several traces of a multitrace record are summed in a plurality of differently time-delayed combinations to produce a second multitrace record. Each trace in the second record represents signal accumulations from a different angle in the subsurface. The traces of the second record are then scanned electronically for picking. The picker uses three criteria for distinguishing an event from its noise background: (1) absolute amplitude, (2) relative amplitude compared to that of neighboring traces, and (3) phase coherence with neighboring traces. That picking process is successful when the events actually have a greater absolute amplitude than the portions of the record preceding and following them. However, it is known that seismic record traces contain events that are at the same, or lower, amplitude levels than the preceding and following noise. The location of events such as these is one particular object of the present invention.

In the present invention, we take advantage of an overall statistical property which we have found seismic records to have when they contain no events. That property is ergodicity. The term "ergodic" has been defined in various ways in the literature. (See for instance: C. E. Shannon, "A Mathematical Theory of Communication," Bell System Tech. J. 27, 625 (1948) and Stanford Goldman, "Information Theory," Prentice-Hall, N.Y. (1953).) For purposes of the present invention, it seems best merely to define what we mean by an ergodic multitrace seismic record. We mean a record in which the amplitudes sampled across the record from trace-to-trace show the same kind of statistical behavior as the amplitudes sampled along any one trace over an interval of time long compared to the dominant frequency of the seismic record. By "same kind of statistical behavior" we signify, for example, the same mean amplitude, and the same distribution about the mean. We have found that seismic records have this ergodic property, to a good approximation, when there are no events on the record.

Ergodicity is a property that characterizes certain kinds of probabilistic data whose sequential values depend upon chance alone, and for our purposes we tend to classify those portions of the seismic record having the ergodic property as containing unmeaningful values, values due to chance alone. On the other hand, when we scan a record, in the manner to be described below, and find portions of the record that do not have ergodicity, we tend to classify those portions of the seismic record as containing meaningful values, values not due to chance alone. Indeed a useful way of describing our method is to say that it is a way of designating those parts of a record as containing meaningful signals that have amplitude values that they would not probably have due to chance alone.

An event within a seismic record may be defined as a portion of the record in which the intertrace similarity exceeds that which would be expected to have resulted from chance alone.

The particular statistical quantities used in our invention may be variously defined, and certain variations are mentioned in the text below, but in general, the quantities include (1) an average amplitude, $\bar{x}$, the average being taken across the traces of the record, (2) a measure $s$, of the deviation of the individual amplitudes from their mean value, this quantity $s$, being a type of standard deviation of the amplitudes sampled across the traces, and (3) a time-average, across-trace-average, absolute amplitude $\sigma$, which is a measure of the expected absolute amplitude of the record in the neighborhood of the across-trace samples.

Our invention can be shown, by advanced statistical methods, to have theoretical justification, but for purposes of this application, we propose to convey the fundamental ideas of the method in a brief verbal way, appealing to the reader's intuition regarding statistical behavior.

In the first place, if a large number of signal amplitude samples are taken both across the traces, and along the traces of a seismic record, one will find as one might expect, that the amplitude is negative about as much as it is positive, and that therefore the time average amplitude is approximately zero. But if absolute values are used in the averaging so that the negative quantities do not cancel the positive quantities, a measure of the expected absolute amplitude is obtained, which in this specification will be denoted by the letter $\sigma$, and which will be called the time-average, across-trace-average, absolute amplitude.

In the second place, if a particular instantaneous part of the record is examined, a part consisting of one amplitude value from each trace (usually sampled along a straight line across the traces), one will sometimes find in averaging the amplitudes, that the positive values tend to cancel the negative values just as they do for the record as a whole, but sometimes not. The samples in which the several amplitudes tend to reinforce each other in sign and magnitude can naturally be suspected to contain a meaningful signal. Their one-directional tendency indicates departure from behavior due to chance alone.

In the third place, if in the examination of the same particular instantaneous part of the record, it is found that the several amplitudes not only reinforce each other in sign and magnitude but they tend to be of the same magnitude as shown by the smallness of their deviation from each other, then there is additional reason to suspect that that part of the record contains a meaningful signal, and that its amplitude values would not have resulted from chance alone.

In the method of the present invention, we measure three quantities: (1) $\sigma$, the time-average, across-trace-average, absolute amplitude; (2) $\bar{x}$, the across-trace-average amplitude, and (3) $s$, the across-trace-average absolute amplitude deviation. The first quantity is a measure of the statistical behavior of the record as a whole, and the latter two quantities are measures of the statistical behavior at an instantaneous part of the record. To provide a uniform basis of comparison for the different parts of the record, we "normalize" the two instantaneous quantities by dividing them by the quantity that pertains to the record as a whole. We then have two quantities: $|\bar{x}|/\sigma$, a normalized across-trace-average amplitude, and $s/\sigma$, a normalized across-trace absolute amplitude deviation. Finally, we examine the pair of normalized quantities, and decide whether they represent a meaningful signal, or just a collection of amplitude values that we might expect to arise by chance alone.

In accordance with the reasoning given hereinbefore, we know that a large normalized average amplitude paired with a small normalized amplitude deviation indicates an event; and conversely a small normalized average amplitude paired with a large normalized amplitude deviation indicates a part of the record that is due to chance alone. However, our invention comprehends more than these types of paired values. By both theoretical and experimental means we have derived quantitative probability distributions for all pairs of values of the two normalized quantities that are likely to be encountered, so that we can determine the quantitative probability of occurrence of any pair of the normalized quantities that would be encountered in the analysis of seismic records. If the probability for the chance occurrence of a given pair of the normalized quantities is below a certain threshold value, we decide that the instantaneous portion of the record represented by that pair contains an event.

As the description of our invention proceeds, it will become evident that the method may be carried out with various types of apparatus, or conceivably even without apparatus. Theoretically it would be possible to have a large table or contoured graph showing the probability of any expectable pair of values of $|\bar{x}|/\sigma$ and $s/\sigma$. Values of these two quantities could be calculated by human scanning of the seismic record, and the probabilities of the paired values could be determined from the table or graph.

Actually, we have found it advantageous to perform the entire method with a machine that automatically determines pairs of the normalized quantities from the seismic record, and then in effect, determines the position of those pairs of values in a two-dimensional field of such values, in which field the relative probabilities of all points are designated. Although the actual operation is performed electronically, the result is as if each pair of the two normalized quantities were represented by a point on a two-dimensional graph, upon which is also a curved line (or straight lines approximating the curve) contour representing a certain threshold probability. If a point representing the paired quantities is on the high probability side of that contour (the side on which are the lower values of $|\bar{x}|/\sigma$ and the higher values of $s/\sigma$) the point is decided to represent a portion of the record that could have arisen by chance alone. On the other hand, if the point representing the paired quantities is on the low probability side of that contour (the side on which are the higher values of $|\bar{x}|/\sigma$ and the lower values of $s/\sigma$), the point is decided to represent a portion of the record in which there is an event.

The preceding paragraphs have given a general description of the method of this invention; and paragraphs below will give specific descriptions of embodiments that have been constructed and used, and other alternative embodiments. The descriptions of the embodiments may be more readily understandable if an advance comment is made about the statistical quantities represented by voltages in some of the analog electrical circuitry. Three quantities have already been mentioned, and described verbally: $\sigma$, $\bar{x}$, and $s$. The first of these, $\sigma$, the time-average, across-trace-average, absolute amplitude in conventional statistical mathematics would most naturally be a time-average root-mean-square. It is quite possible to build electrical apparatus that performs squaring and square-rooting, but in carrying out our invention we note that in the problem at hand the only important purpose of the squaring would be to make the pertinent quantities all of the same sign. Electrically, the sign-changing is much easier to do by full-wave rectification. So this electrical operation is used instead of the less convenient double operation of squaring and square-rooting. We recognize, of course, that the two operations are not mathematically exact equivalents. A root-mean-square is weighted more by its larger components than is an absolute value average. But it can be shown that, for present purposes the difference is not significant and for the purpose of this invention we shall consider them equivalent. Similar remarks apply to the electrical representation of the quantity, $s$, the across-trace-average, absolute amplitude deviation.

The quantity, $\bar{x}$, the across-trace-average amplitude, is the only one of the three defined quantities that is not absolute or single-signed. It can be either positive or negative. Nevertheless, it will be noted that in the electrical embodiment of the method, the voltage representing $\bar{x}$ is also applied through a full-wave rectifier, and this too is for electrical convenience, so that the electrical representation of the paired values of $|\bar{x}|/\sigma$, and $s/\sigma$ can be made in a single quadrant.

The objects and features of the invention will be readily apparent to those skilled in the art from the specification and appended drawings illustrating certain preferred embodiments wherein.

Figures 1A, 1B:
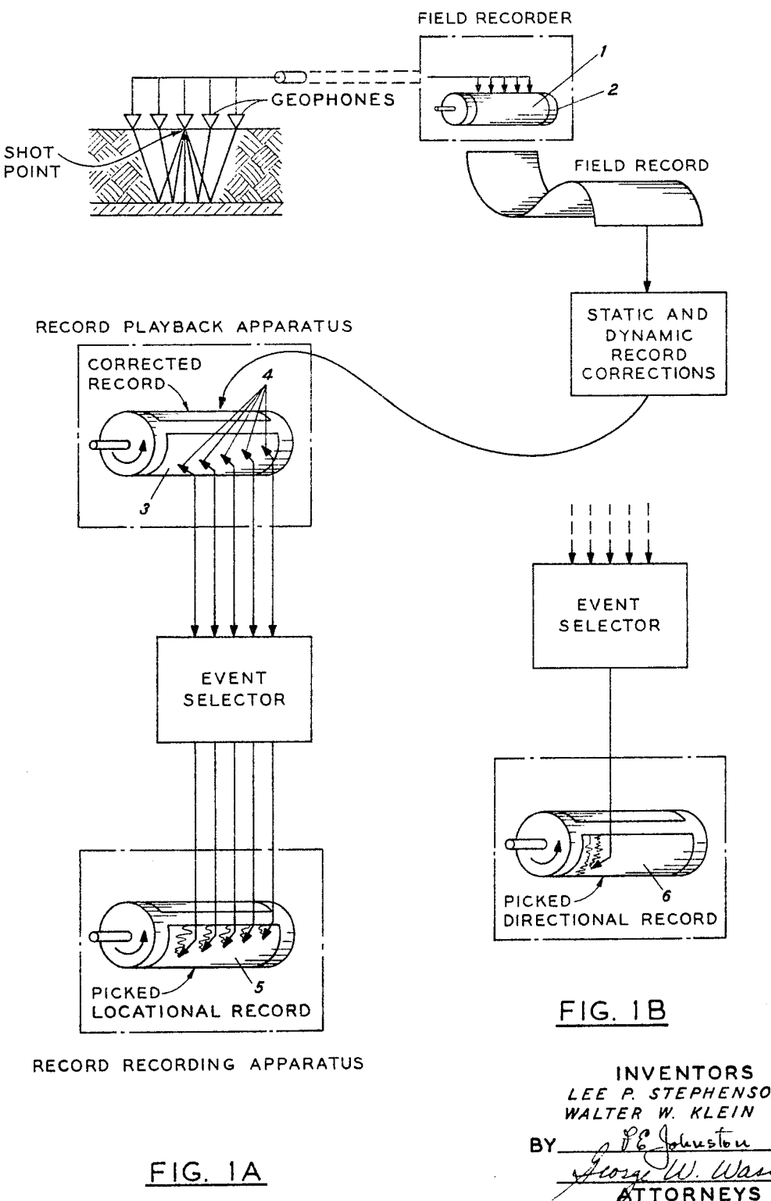
FIGURE 1A is a flow diagram illustrating the field recording of a seismic record, the application of static and dynamic corrections and the process of event selection to a picked seismic record.
FIGURE 1B illustrates the event selector used in producing a directional trace record.

FIGURE 1 illustrates in flow diagram form the procedure generally followed in processing a seismic record to event selection. At the upper left-hand corner a cross section through an earth formation is illustrated with a spread of geophones at the earth's surface above a subsurface seismic reflector. A seismic explosion is initiated at the shot point and seismic energy is transmitted into the formations and reflected from a subsurface reflector generally along the paths illustrated. The geophones detect movement of the earth's surface in response to reflected energy and transmit signals to the field recorder where the signals are recorded on a magnetic tape 1 in recording device 2. This record is known as the field record. Usually the field record is taken to a central data processing location where the information in the record is processed and analyzed to an eventual interpretation of the subsurface structure it may represent.

At the data processing location, the record is first passed through a static and dynamic record correction device where the individual traces are adjusted in position to correct the record for fixed and variable time adjustments due to the surface position of geophones with respect to each other and the shot point. A corrected tape 3 is thus produced and then reproduced in a record playback apparatus by a plurality of individual reading heads 4 generally adjustable along the surface of the playback apparatus with respect to the start of the record. The individual signals reproduced by the playback heads are then processed through an event selector where the individual events are picked and transmitted to a second record recording apparatus to produce a picked record 5.

The event selector may be programmed to duplicate either the original multitrace corrected record 3 in the form of a picked multitrace record 5 or to supply a recorder with picked directional signals for record 6. The directional signals are generated by summing the individual signals from the corrected multitrace record to accentuate reflections arriving with a particular moveout or direction within the corrected record.

Figure 2:
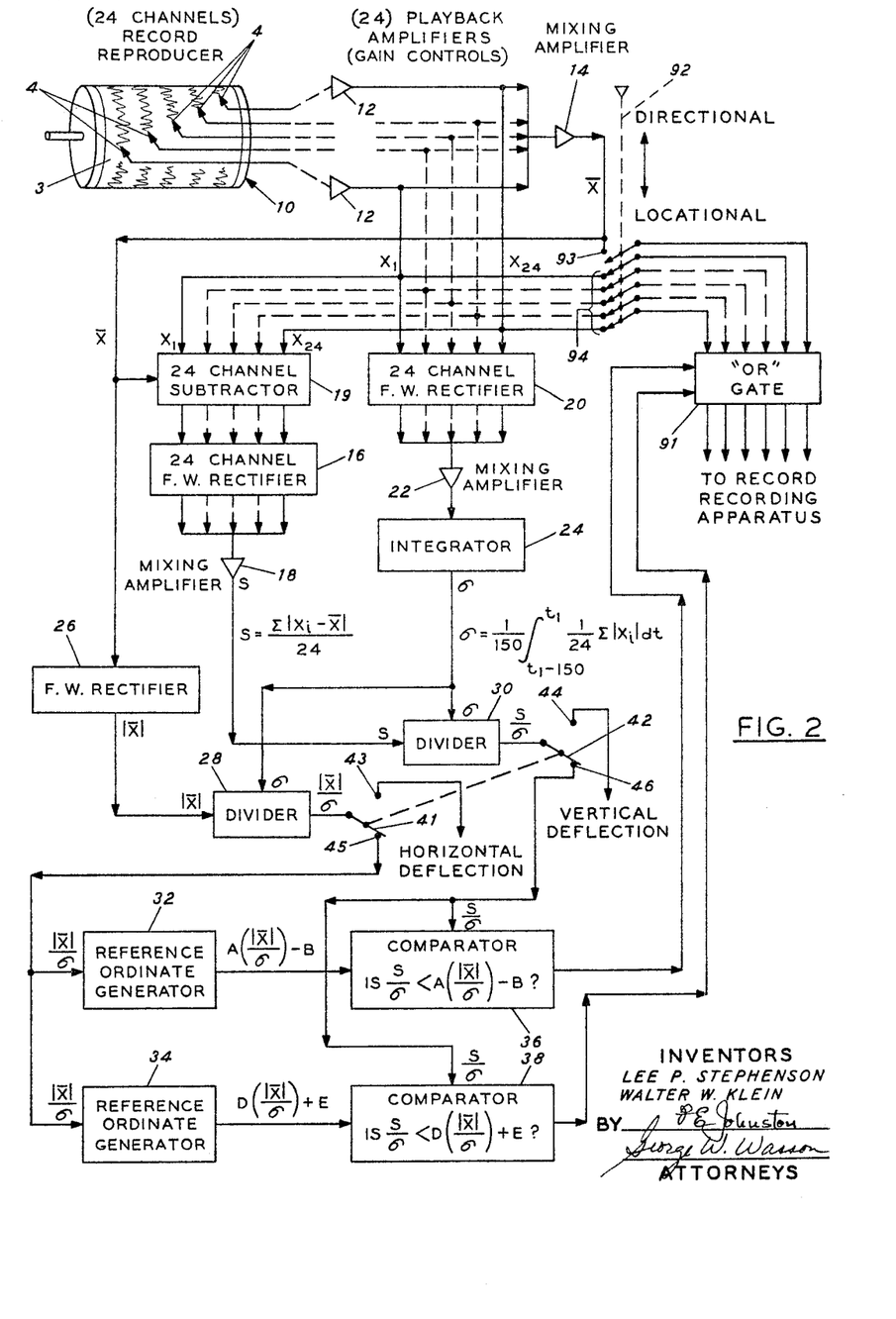
FIGURE 2 is a block diagram illustrating the seismic data processing method of the present invention.

The novel function performed by the event selector of the present invention is illustrated in detail in the block diagram of FIGURE 2. The event selector performs the function of generating the quantities $\bar{x}$, $s$ and $\sigma$ and the ratios:

$$|\bar{x}|/\sigma \text{ and } s/\sigma$$

It then uses the two generated ratios in the actuation of a gate forming a part of a system for selectively intensifying appropriate parts of the seismic information that has been processed through the event selector. The methods and apparatus employed to generate these quantities and ratios will now be described as the operation of the event selector of FIGURE 2 is described.

*Across-Trace-Average-Amplitude $\bar{x}$*

In FIGURE 2 the corrected record 3 is illustrated at the upper left-hand corner with the individual reading heads 4 generating the signals contained on the record. The conventional field record contains twenty-four traces and for that reason the traces are numbered from one through twenty-four even though only five are illustrated. The reading heads may be linearly displaced with respect to a line representing the intersection of an axial plane with the surface of the cylindrical drum. Various linear displacements of the heads correspond to various moveouts, as is well known in the art. The electrical signals from the reading heads are fed through a corresponding number of playback amplifiers and gain controls 12 adjusted to give traces of equal average amplitude.

The twenty-four resulting voltages are then led into the mixing amplifier 14 which sums the voltages and also normalizes the sum. This normalized sum is the quantity $\bar{x}$, the "across-trace-average-amplitude."

*Across-Trace-Average Absolute Amplitude Deviation $s$*

The voltages from the amplifiers 12 are led also into twenty-four-channel subtractor 19 which subtracts from each channel voltage $x_1, \ldots, x_{24}$, the single voltage representing $\bar{x}$, the "across-trace-average-amplitude."

Figure 3:
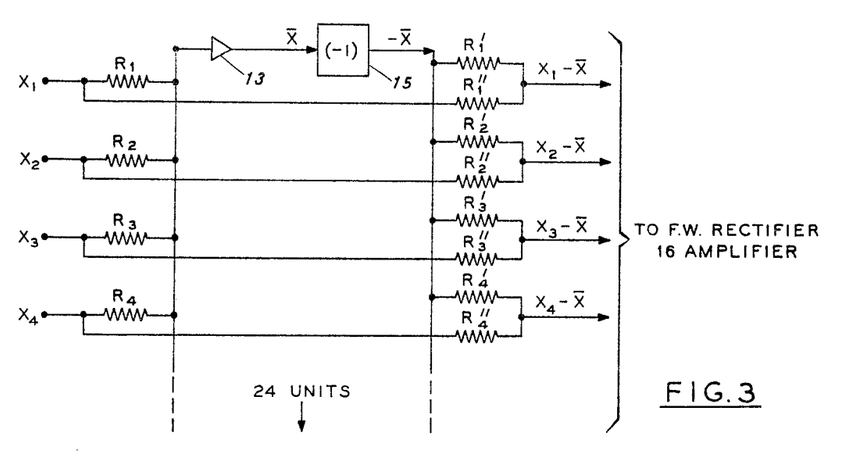
FIGURE 3 is a schematic diagram of the subtractor of FIGURE 2.

The twenty-four channel subtractor 19 may be constructed in various ways that would be evident to persons skilled in the analog computing art. A general way is represented in FIGURE 3 and the specific way we have found most advantageous is indicated by the circuit diagram of FIGURE 4. Referring to FIGURE 3, the voltages representing the quantities $x_1, x_2$, etc., as derived from the amplifiers 12, are fed through identical resistors $R_1$, $R_2$, etc. into a mixing amplifier 13, which sums them and normalizes the sum. The resulting voltage representing $\bar{x}$ is then fed into an inverter 15. The inverter supplies a voltage proportional to the quantity $-\bar{x}$ and transfers that quantity into twenty-four identical resistors, $R_1'$, $R_2'$, etc., each of which is paired with an identical resistor $R_1''$, $R_2''$, etc. into which one of the voltages representing $x_1$, $x_2$, etc. is fed. Eventually, voltages representing the quantities $x_1-\bar{x}$, $x_2-\bar{x}$, etc. are available from the right-hand terminals as an output terminal to the full-wave (F.W.) rectifiers shown in FIGURE 3.

Figure 4:
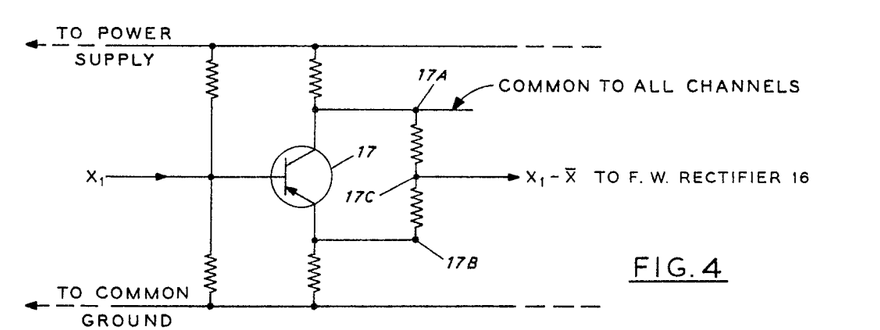
FIGURE 4 is an alternative form for the subtractor of FIGURE 2.

Reference should now be made to FIGURE 4, where the essential parts of a single channel of our subtractor are shown. If twenty-four channels are being used, twenty-three other units like that represented in FIGURE 4 must be thought of as connected to the same power supply and ground lines. In FIGURE 4, a voltage representing the quantity $x_1$ is shown being fed into the base of transistor 17. Assuming for the instant that this voltage is negative, it causes a proportional current to flow through the emitter-collector circuit. At point 17B, a drop in voltage must occur that is proportional to $x_1$. At point 17A, there would be a rise in voltage also proportional to $x_1$ if point 17A were not connected to the corresponding point of all the other channels, but because it is so connected, the change in voltage must be proportional to the average of $x_1$, $x_2$, etc., or to $\bar{x}$. Also, the voltage change at point 17A due to a change in $x_1$ alone is of opposite sign from the change at 17B. It follows that at point 17C, a voltage change occurs that is proportional to $x_1-\bar{x}$. Twenty-four voltages such as that from point 17C of FIGURE 4 constitute the output of subtractor 19 in FIGURE 2.

The twenty-four voltages from subtractor 19 are led to a twenty-four-channel full-wave rectifier 16, which performs an operation equivalent to the mathematical operation of taking the absolute values of the twenty-four voltages. The resulting rectified voltages are then fed into mixing amplifier 18 which sums them and normalizes the sum. The output of mixing amplifier 18 is the electrical equivalent of the quantity $s$, the "across-trace-average, absolute amplitude deviation."

*Time-Average, Across-Trace-Average, Absolute Amplitude $\sigma$*

The twenty-four voltages from the playback amplifiers 12 are also led into the twenty-four-channel full-wave rectifier 20 which performs the electrical operation analogous to the mathematical operation of taking the absolute values of those signals.

The twenty-four rectified voltages are then led to mixing amplifier 22 which sums them and normalizes the sum. The normalized sum signal is then led into integrator 24. This is an RC integrator of the type well known in the analog computing art, having its time constant so regulated that its output is a running integral of the input over a predetermined prior time interval. It can be shown that the interval of integration should be several periods of the lowest frequency of the pass band of the seismic signal and, for the purpose of the present invention this interval has been selected as 150 milliseconds.

The output of integrator 24 is the electrical equivalent of the quantity $\sigma$, the "time-average, across-trace-average, absolute amplitude."

*Dividers*

The description has now covered the derivation of three electrical voltages corresponding to the quantities $|\bar{x}|$, $s$, and $\sigma$. The following paragraphs will cover the derivation from those quantities of two electrical voltages corresponding to the two ratios:

$$|\bar{x}|/\sigma \text{ and } s/\sigma$$

While various types of dividers described in the analog computing literature are capable of producing the desired ratios, analog dividers must necessarily be somewhat specific in purpose and some dividing arrangements have disadvantages that would make them inconvenient, or useless, for the method of the present invention. The divider constructed for the present invention will therefore be described in detail.

Figure 5A:
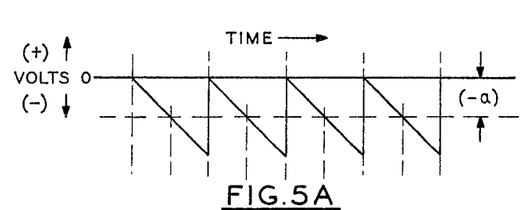
FIGURES 5A and 5B are waveform illustrations of the operation of dividers 28 and 30 of FIGURE 2.
Figure 5B:
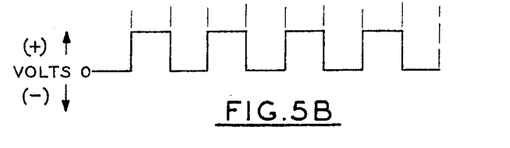

Reference will be made first to FIGURES 5A and 5B where the overall scheme of the divider is illustrated. Part of the divider circuit generates sawtooth waves as shown in FIGURE 5A. These waves have a fixed period of about 500 microseconds, which is short compared to the period of any of the components of the seismic signals being processed. However, the slope of the sawtooth waves is variable and, in volts per second, is made proportional to the divisor. Another part of the divider detects the time when the sawtooth voltage crosses a certain voltage designated as voltage $(-a)$ in FIGURE 5A. The quantity, $a$, represents the dividend. The output signal of the divider is a train of square waves as shown in FIGURE 5B. These square waves are of a fixed height, but the width of their positive, non-zero, part is variable, and that width is made equal to the time interval during which the sawtooth voltage is between zero and $(-a)$ as indicated in FIGURE 5. The output square waves are passed into an integrator and integrated. Mathematical consideration of FIGURES 5A and 5B shows that the width of the square waves to be integrated, and, therefore, the value of their integral must be directly proportional to the quantity, $a$, the dividend, and inversely proportional to the slope of the sawtooth wave, the divisor. The integral must therefore represent the quotient being sought.

The details of the divider will now be described with reference to FIGURE 6. The unijunction transistor Q1 produces negative pulses at a fixed rate, about every 500 microseconds. Q1 is nonconducting until capacitor 51 charges through resistor 52 the point where the emitter voltage equals the discharge voltage of Q1. Then Q1 becomes highly conductive not only discharging capacitor 51, but also drawing current through resistor 53 so as to lower momentarily the voltage at the left of capacitor 54. The negative pulse is transmitted through capacitor 54 to the base of transistor Q2, thereby causing it to conduct, to effectively short out and discharge capacitor 55. The discharge of capacitor 55 occurs in a very short time, of the order of a microsecond. After that discharge, and until the time when the next negative pulse comes through capacitor 54, capacitor 55 charges through transistor Q8, at a charging rate directly proportional to the voltage impressed on the base of transistor Q8. It is here, at the base of Q8 that the voltage corresponding to the quantity $\sigma$, the divisor, is applied. So, in the time intervals between negative pulses from unijunction transistor Q1, capacitor 55 charges at a rate proportional to the divisor $\sigma$. It will now be appreciated that the voltage at the lower terminal of capacitor 55, and therefore also at the base of transistor Q3, is the sawtooth voltage already described and represented in FIGURE 5A.

Transistor Q3 is merely an emitter-follower amplifier, which reproduces at its emitter terminal, the same, already-described, sawtooth voltage, but under more favorable impedance conditions for transmission to the next part of the circuit.

Figures 6, 7:
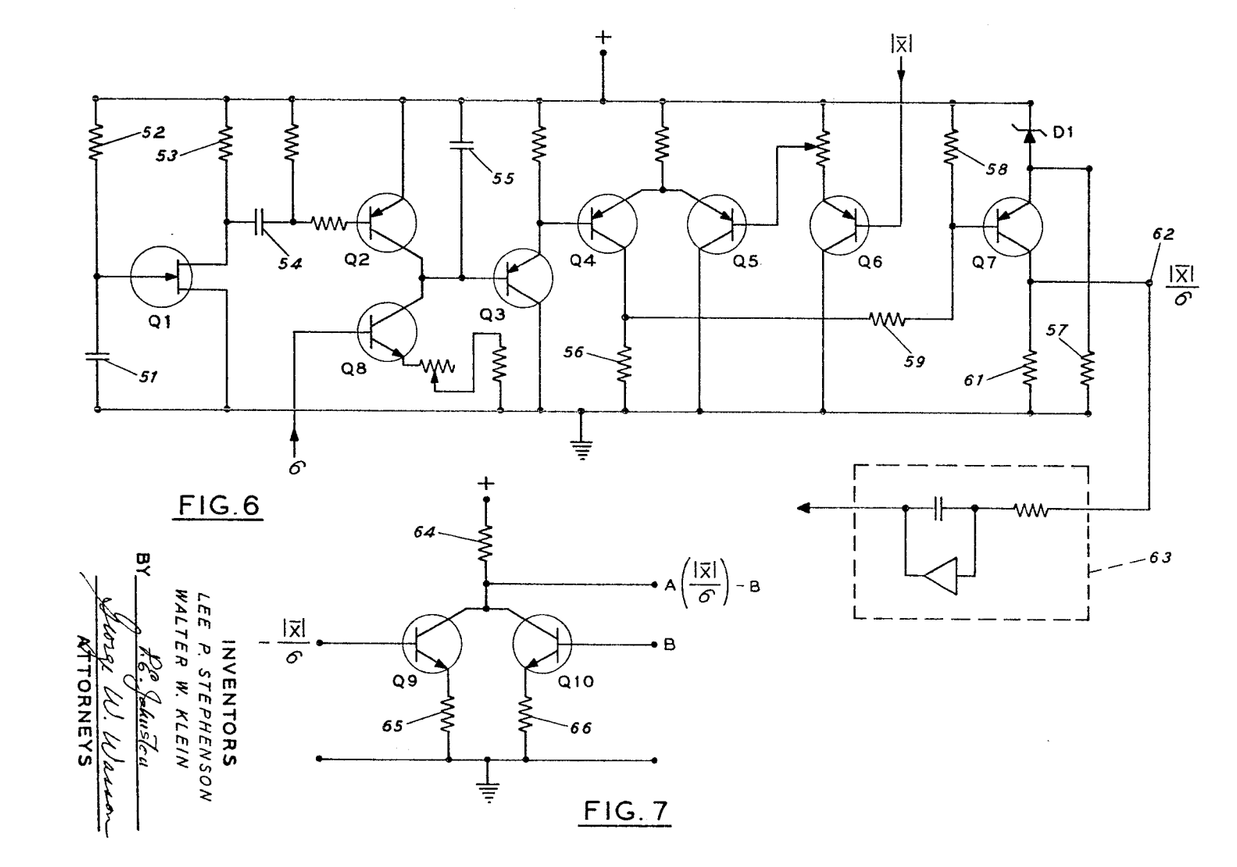
FIGURE 6 is a schematic diagram of the circuit of the dividers 28 and 30.
FIGURE 7 is a schematic diagram of comparators 36 and 38 of FIGURE 2.

For purposes of this description, it is now convenient to skip to the right in the diagram of FIGURE 6 where the voltage representing the dividend, $|\bar{x}|$, is introduced at the base of transistor Q6. Transistor Q6, like transistor Q3, is merely an emitter-follower amplifier. It reproduces in its emitter circuit, a voltage representing $|\bar{x}|$, under more favorable impedance conditions than those in its base circuit.

Now the description has covered the production out of transistor Q3, of the sawtooth voltage, whose slope is proportional to the divisor, $\sigma$, and the production out of transistor Q6, of a voltage proportional to the dividend, $|\bar{x}|$. These two voltages are applied to the two inputs of the differential amplifier consisting of transistors Q4 and Q5.

Transistors Q4 and Q5 constitute a differential amplifier whose output is the voltage across resistor 56 in the collector circuit of Q4. If Q4 and Q5 were operating in a linear region the output voltage across resistor 56 would be proportional to the difference of the voltages applied to the bases of Q4 and Q5. But for present purposes Q4 and Q5 are operated in a region such that a small excess of the base voltage of Q4 over that of Q5 causes Q4 to conduct and Q5 to cease conducting. A small deficiency of the base voltage of Q4 under that of Q5 causes Q4 to cease conducting and causes Q5 to conduct.

When the voltage applied to the base of Q4 exceeds the voltage applied to the base of Q5, and Q4 is conducting, the voltage at the top of resistor 56 rises. This voltage rise is applied to the base of transistor Q7, and causes it to cease conducting. Transistor Q7 is the generator of the output quotient square waves represented in FIGURE 5B. The emitter of Q7 is biased through Zener diode D1 and resistor 57, and the base of Q7 is biased through resistors 58, 59, and 56, so that when no other voltage is applied to the base of Q7, it passes a definite current, and produces a definite voltage at the top of resistor 61 corresponding to the fixed positive voltage of the top of the square waves of FIGURE 5B. But when the sawtooth voltage applied to the base of Q4 exceeds the voltage applied to the base of Q5, and the consequent positive voltage rise occurs at the top of resistor 56, transistor Q7 ceases conducting, and the output voltage at the top of resistor 61 becomes zero, corresponding to the zero parts of the square wave of FIGURE 5B.

From the description to this point it will be evident that at terminal 62 of FIGURE 6, the square wave voltages corresponding to those represented in FIGURE 5B will appear. The positive area of the square waves, per unit time, is proportional to the desired quotient $|\bar{x}|/\sigma$. In the apparatus illustrated in FIGURE 2 it is desirable that the quotient be converted to a smoothed voltage proportional to the average value of $|\bar{x}|/\sigma$ over many periods of the square wave, but still varying as rapidly as the high frequency components of the seismic signals being processed. The voltage from terminal 62 is therefore led through an integrator 63 to produce the smoothed result.

The divider 30 is identical in construction and action, the only difference being the input of $s$ rather than $|\bar{x}|$ so that the output will be the quotient, $s/\sigma$.

The output signals from the dividers 28 and 30 are supplied to switches 41 and 42, respectively, so that the output signals may be selectably supplied either to the deflection systems at contacts 43 and 44 of an oscillographic display unit or to reference ordinate generators 32 and 34 at contacts 45 and 46. The selection of either the deflection system or the ordinate generator will provide alternate forms for comparing the ratios and for picking the events within the record being analyzed.

*Automatic event selection*

The purpose in generating the ratios $s/\sigma$ and $|\bar{x}|/\sigma$ is to permit these quantities to be used as the coordinates of points representing the instantaneous probability of an event being present within the record under analysis. We have derived quantitative probability distributions of pairs of these ratios and have established isoprobability curves of these ratios as the locus of points having a given probability that chance alone would yield an $|\bar{x}|/\sigma$ at least as large, and an $s/\sigma$ at least as small as the values represented by any one of the points on the curve.

These isoprobability curves may be derived in an analytical approach by determining, point by point, the value for one of the ratios when the other ratio is of a known value and has a given probability of being within that value. Another method for deriving isoprobability curves is to use an experimental statistical procedure. In this method, an ergodic record of a selected number of traces is synthesized from a source of random values. This ergodic record is then sampled to generate a large number of $|\bar{x}|/\sigma$ and $s/\sigma$ pairs and these pairs are plotted as points in a two-dimensional space having $|\bar{x}|/\sigma$ and $s/\sigma$ as coordinates. If any one of these plotted points is then selected, it is then possible to determine the probability that chance alone would yield a point with a larger value of $|\bar{x}|/\sigma$ and simultaneously a smaller value of $s/\sigma$ by merely counting the number of plotted points having both a larger abscissa and a smaller ordinate and then dividing by the total number of plotted points.

Carrying out the above procedure for a large number of points gives a field of probability values. When this field of values is plotted and, when either equal values are joined by lines or when lines are drawn approximating equal values, the resulting lines produce isoprobability curves. One such curve is shown at 8E in FIGURE 8. Once the isoprobability curves have been generated it is then possible to plot the observed ratios of $|\bar{x}|/\sigma$ and $s/\sigma$ and to be able to make a determination of the probability of an event being present within the instantaneous portion of the record that has produced the compared ratios. Another method for handling the observed ratios is to generate an equation for an appropriate isoprobability curve and to compare electronically the observed ratios from the previously described apparatus to the equation of the curve. Events within a record under analysis can then be selected by suitable control of gating apparatus based on the comparison of the generated equation and the observed ratios.

Figure 8:
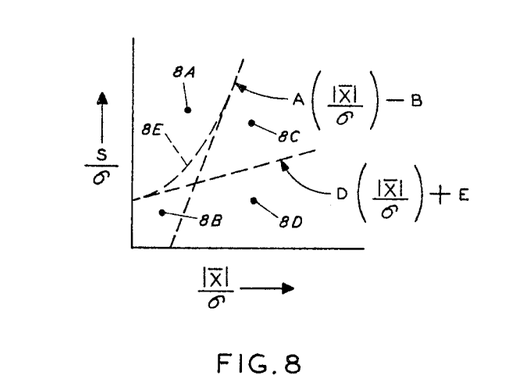
FIGURE 8 is a graphic illustration of the function performed by the comparators of FIGURE 2.
Figure 9:
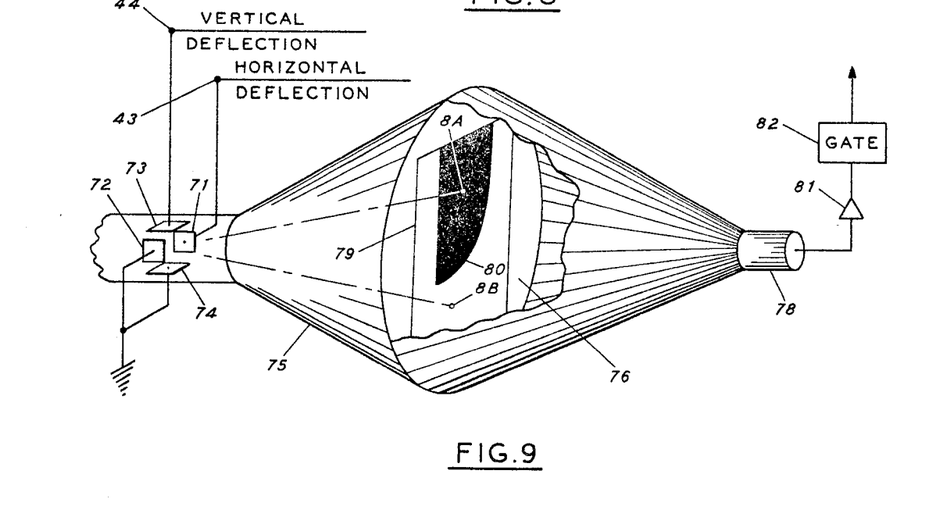
FIGURE 9 is an alternative form of apparatus for performing the function of the comparators of FIGURE 2.

Alternate forms of comparison of the two ratios generated in the dividers are illustrated in FIGURES 8 and 9. The graphic presentation of FIGURE 8 illustrates a series of comparisons of the two determined ratios in the form of dots appearing within the graph having ordinates $s/\sigma$ and $|\bar{x}|/\sigma$. The physical plotting of these ratio quantities, as previously suggested, could result in a display of the type shown in FIGURE 8. In the actual operation of this invention however, the comparison of these quantities is done electronically and, in fact, the interpretation of the value of the quantities is done electronically; however, to assist in an understanding of the picking of events by the method of the present invention, the graph of FIGURE 8 and the plotted quantities represented at 8A, 8B, 8C and 8D will be described.

FIGURE 8 is a plotting of points in a coordinate system where the coordinates are the instantaneous values of the output signals of the dividers 28 and 30. The position of plot 8A represents paired quantities within the high probability area of the compared ratios, that is, a small normalized average amplitude paired with a relatively large normalized amplitude deviation. The high chance probability of the plot 8A indicates the absence of an event and therefore that portion of the input signal to the event selector would not be picked. Point 8B illustrates a small normalized average amplitude paired with a small normalized amplitude deviation. Such a point represents a joint occurrence of the two signals from the dividers that is not likely to be due to chance alone and such a plot should be selected as representing an event. Point 8C represents a large normalized average amplitude paired with a large normalized amplitude deviation and also indicates low chance alone alignment and therefore the improbability that identifies an event. Point 8D represents a large normalized average amplitude paired with a small normalized amplitude deviation and indicates an event. It should be evident that the most probable plotted positions for the ratios in the coordinates of FIGURE 8 would lie within the area defined by a small normalized average amplitude and a large amplitude deviation; that area defining unmeaningful noise or no event signals.

The automatic selection of events for plotting can be accomplished by comparing quantities representing the coordinates of points on a plotting surface with quantities from an equation representing the demarcation between the acceptance and rejection side of an isoprobability contour curve on the surface such as the dot-dash isoprobability curve 8E of FIGURE 8. It is also possible to approximate the curve by the use of the two straight lines represented by the quantities $A(|\bar{x}|/\sigma) - B$ and $$D(|\bar{x}|/\sigma) + E$$

It then becomes a relatively simple operation to compare the quantity $s/\sigma$ separately with these two quantities and to actuate the event selecting apparatus whenever $s/\sigma$ becomes less than either one of the quantities. The manner for generating these two quantities, referred to as reference ordinates, will be described hereinafter.

It should be understood that curve 8E represents the threshold for differentiating between probable and improbable ratios of signals or between unmeaningful noise and meaningful events. The position and contour of the curve will determine what signals within the record being analyzed will be picked as events for plotting. The curve may be adjusted to reflect any desired probability, that is, if the chance is 1:1000 that random noise would align in such a manner that the plotting of a point would fall outside of the curve of 8E by having an abscissa larger than and at the same time an ordinate smaller than a point along the curve, then that curve can be said to be a 1:1000 curve. A curve intersecting the $s/\sigma$ ordinate nearer a zero value would be a lower chance probability curve and would require a more stringent or less likely alignment of noise to result in a pick as an event.

The approximation of the curve 8E by the straight lines illustrated in FIGURE 8 allows for an easy adjustment of the threshold limits. The values of quantities A, B, D and E may be adjusted to provide for probability variations. Representative values for these quantities that we have used are as follows: $A=1.64$; $B=0.480$; $D=0.425$; $E=0.370$.

An alternative form of apparatus for accomplishing the event selection scheme is illustrated in FIGURE 9 where the output signals of dividers 28 and 30 are supplied to the deflection plates of a cathode-ray tube. The terminals 43 and 44 of FIGURE 2 are connected to the horizontal deflection plates 71 and 72 and the vertical deflection plates 73 and 74 of a cathode-ray tube 75. With the quantity $s/\sigma$ applied to the vertical deflection plates and the quantity $|\bar{x}|/\sigma$ applied to the horizontal deflection plates it may be seen that the position of the spot of the electron beam on the face 76 of the cathode-ray tube will be determined by the values of these two quantities. A mask 79, provided with a blanking portion 80 representing the probability area as illustrated in FIGURE 8 within the curve 8E, is placed on the face 76 of cathode-ray tube 75. It should be evident that if the spot is in the 8A position on the face of the cathode-ray tube that it will be within the blanking portion 80 of the mask 79 and that the photosensitive device 78 will not generate a signal. However, when the spot is in the 8B position it will fall outside of the blanking portion 80 and will energize the photosensitive device 78. The output signal from the photo tube 78 will then be transmitted through amplifier 81 to the gating device 82 for actuation of suitable record recording apparatus.

Reference ordinate generator

The comparison graphically illustrated in FIGURE 8 is accomplished by first generating the reference ordinate and then performing the comparison. Following the dividers 28 and 30, the next circuit in the block diagram of FIGURE 2 is the reference ordinate generator 32. The essential parts of this circuit are represented in FIGURE 7. The voltage representing $-|\bar{x}|/\sigma$ is led to the base of transistor Q9, which is operated as a degenerative amplifier so that the current change in its collector-emitter circuit is, to a close approximation, proportional to the base voltage change divided by the emitter resistance. It follows then that the part of the voltage change at the collector terminal of Q9 that is due to the collector current in Q9 is proportional to the base voltage change times the ratio of resistance 64 to resistance 65. These two resistors are chosen so that the ratio of the resistance represents the coefficient A.

In a similar manner, a voltage representing the constant B is led to the base of transistor Q10, and the part of the voltage change at the collector terminal of Q10 (the same as at the collector terminal of Q9) that is due to the collector current in Q10 is proportional to the base voltage change times the ratio of resistor 64 to resistor 66. The resistor 66 is chosen so that this voltage change represents the constant B. Now it will be apparent from the above explanation that the total voltage change at the common collector terminal of transistors Q9 and Q10 represents the desired quantity: $A(|\bar{x}|/\sigma)-B$.

Reference ordinate generator 34 employs the same circuit as that used in generator 32. However, since the output of generator 34 is the sum of two quantities $D(|\bar{x}|/\sigma)+E$, the polarity of the signal to the base of the transistors performing the function similar to that of transistor Q9 or Q10 will be reversed. Preferably the polarity of the constant will be changed. The output of the generator 34 will be the desired sum of the two input quantities: $D(|\bar{x}|/\sigma)+E$.

Comparators

The comparators 36 and 38 receive the reference ordinate signals supplied from generators 32 and 34, respectively, along with the ratio $s/\sigma$ representing the average amplitude deviation of the seismic record being processed. The comparators operate independently and supply a signal to an "OR" gate 91. As connected and operated by the two comparators, the OR gate 91 is actuated by a signal from either comparator so that whenever $s/\sigma$ is less than the reference ordinate signals, the gate is open to pass its input signals.

The circuit of a comparator to accomplish the duty of comparators 36 or 38 is well known in the art of data processing. Its function is to compare two input signals and supply an output signal when the two signals are equal or when a particular relationship in the two signals has been satisfied. In the event selector of the present invention, the comparators provide an output signal when $s/\sigma$ becomes less than the generated reference ordinates.

Recording selected events

The OR gate 91 of FIGURE 2 or the gate 82 of FIGURE 9 passes or interrupts the recording of the record being processed in accordance with the automatic decisions of the event selector. As illustrated in FIGURES 1 and 2 the gate 91 has alternative energizations available, that is, it may be operated to record individual traces of a multitrace record or it may be operated to record the summation signal of all of the traces in a plurality of different moveout angles or directions. For the alternative displays the several signals are supplied to separate contacts of a switch 92 with the summation signal at contact 93 and the individual signals at contacts 94. In the "locational" or down position the individual traces will be passed through gate 91 and in the "directional" or up position the summation signal will be passed. It should be understood that appropriate time delay or hold circuits may be employed to insure that the recording device energized through the gate will remain energized long enough to record the desired time portion of an event.

Summary

It should now be evident that the process of recording an event selected record of input seismic data from a multitrace seismic record has been fully accomplished in an automatic manner. The record itself supplies the information that has been necessary to distinguish the unmeaningful noise from the meaningful signal and the selection of events within the record has been accomplished on the basis of the signals present within the record being analyzed and not on an arbitrarily determined setting.

While the process as described herein has accomplished event selection on the satisfaction of what may be described as a single criterion, departure from ergodicity, it is possible to use the method of the present invention in conjunction with the method described in the aforementioned copending application of the present inventors, Serial No. 842,621, now U.S. Patent 3,149,302. In the joint use of the two methods, events would be selected on the basis of departure from ergodicity, absolute amplitude, relative amplitude, and time coherence.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:

1. The method of processing a seismic record, composed of a plurality of seismic traces, to designate a part of the record that contains a meaningful signal, as distinguished from unmeaningful noise, comprising the steps of:
    (a) measuring a time-average, across-trace-average, absolute amplitude characteristic of at least a portion of the record in the neighborhood of a particular instantaneous part of the record under examination,
    (b) measuring at said particular instantaneous part of the record an across-trace-average amplitude,
    (c) measuring at the same said particular instantaneous part of the record an across-trace-average absolute amplitude deviation characteristic,
    (d) producing a first signal representing the ratio of said across-trace-average amplitude to said time-average, across-trace-average, absolute amplitude characteristic,
    (e) producing a second signal representing the ratio of said across-trace-average absolute amplitude deviation characteristic to said time-average, across-trace-average, absolute amplitude characteristic,
    (f) determining the position of the pair of said first and second ratios in a probability distribution of many pairs of such ratios,
    (g) and designating said particular instantaneous part of the record as containing a meaningful signal if the position of said paired ratios lies in a region of said probability distribution of many paired ratios in which it would not probably lie due to chance alone.

2. The method of claim 1 wherein parts of said record are designated as containing meaningful signal when said second ratio signal is smaller than said first ratio signal multiplied by a first constant plus a fixed second constant, wherein said first and second constants are quantities defining said region of said probability distribution of said many pairs of such ratio signals.

3. The method of claim 1 wherein parts of said record are designated as containing meaningful signal when said second ratio signal is smaller than said first ratio signal multiplied by a third constant minus a fixed fourth constant, wherein said third and fourth constants are quantities defining said region of said probability distribution of said many pairs of such ratio signals.

4. The method of claim 1 wherein parts of said record are designated as containing meaningful signals by determining the position of said pair of said first and second ratios in a two-dimensional field that is divided by a contour representing a threshold probability, said contour being defined by an equation.

5. The method of processing a seismic record, composed of a plurality of traces of varying amplitude to designate a part of said record that contains a meaninful signal, as distinguished from unmeaningful noise, comprising the steps of:
  (a) measuring a first value representative of the expected absolute amplitude of said traces in at least a portion of said record in the time neighborhood of a particular part of said record under examination,
  (b) measuring at said particular part of the record a second value representing the average of the instantaneous amplitudes of said traces in said record,
  (c) measuring at the same particular part of the record a third value representing the average absolute deviation between the instantaneous amplitudes and said second value,
  (d) normalizing said second and third values by dividing each by said first value to establish second and third ratios respectively,
  (e) determining the position of the pair of said ratios in a probability distribution of many pairs of such ratios,
  (f) and designating a part of said record as containing meaningful signal if the position of said paired ratios lies in a region of said probability distribution of many paired ratios in which it would not probably lie due to chance alone.

6. The method of claim 5 wherein parts of said record are designated as containing meaningful signal when said normalized second ratio signal is smaller than said normalized first ratio signal multiplied by a first constant plus a fixed second constant, wheerin said first and second constants are quantities defining said region of said probability distribution of said many pairs of such ratio signals.

7. The method of claim 5 wherein parts of said record are designated as containing meaningful signal when said normalized second ratio signal is smaller than said normalized first ratio signal multiplied by a third constant minus a fixed fourth constant, wherein said third and fourth constants are quantities defining said region of said probability distribution of said many pairs of such ratio signals.

8. The method of claim 5 wherein parts of said record are designated as containing meaningful signals by determining the position of said pair of said first and second ratios in a two-dimensional field that is divided by a contour representing a threshold probability, said contour being defined by an equation.

9. The method of processing a seismic record, composed of a plurality of seismic traces of information having amplitude variations, to designate a part of the record that contains a meaningful signal, as distinguished from unmeaningful noise, comprising the steps of:
  (a) summing the absolute amplitude values of said information in all traces of said record for a predetermined time portion of said record in the neighborhood of a particular instantaneous part of said record under examination and integrating said sum to establish a time-average, across-trace-average, absolute amplitude value of said record during said integration interval,
  (b) summing the amplitude values of said information in all traces of said record at said particular instantaneous part to establish an across-trace-average amplitude value for said information at said instantaneous part of said record,
  (c) algebraically subtracting the instantaneous amplitude value of said information in each trace of said record from across-trace-average amplitude value of said information in said record and averaging the absolute values of the resulting differences to establish an across-trace-average absolute amplitude deviation value for said information at said instantaneous part of said record,
  (d) dividing said value of step (b) by said value of step (a) to establish a first ratio representing the normalized across-trace-average amplitude of information at said instantaneous part of said record,
  (e) dividing said value of step (c) by said value of step (a) to establish a second ratio representing the normalized across-trace absolute amplitude deviation of information at said instantaneous part of said record,
  (f) determining the position of the pair of said first and second ratios in a probability distribution of many pairs of such ratios,
  (g) and designating said particular instantaneous part of the record as containing a meaningful signal if the position of said paired ratios lies in a region of said probability distribution of many paired ratios in which it would not probably lie due to chance alone.

10. The method of claim 1 in which the time-average, across-trace-average, absolute amplitude characteristic is a root-mean square.

11. The method of claim 1 in which the across-trace-average absolute amplitude deviation characteristic is a root-mean square.

12. An apparatus for processing a seismic record, composed of a plurality of reproducible seismic traces of information having amplitude variations, to designate a part of the record that contains a meaningful signal, as distinguished from unmeaningful noise, comprising the combination of:
  (a) means for reproducing the absolute amplitude values of said information in each of said traces and for summing the instantaneous values of all of said reproduced traces of said record for a predetermined time portion of said record in the neighborhood of a particular instantaneous part of said record under examination, circuit means for integrating said sum over said predetermined time portion to establish a time-average, across-trace-average, absolute amplitude value of said record during said integration interval,
  (b) circuit means for summing the instantaneous amplitude values of said information reproduced in each trace of said record at said particular instantaneous part to establish an across-trace-average amplitude value for said information at said instantaneous part of said record,
  (c) circuit means for algebraically subtracting the instantaneous amplitude value of said information reproduced in each trace of said record from said across-trace-average amplitude value of said information in said record and circuit means for rectifying said resulting differences to establish an across-trace-average absolute amplitude deviation value for said information at said instantaneous part of said record,
  (d) circuit means for dividing said value of step (b) by said value of step (a) to establish a first signal representing the normalized across-trace-average amplitude of information at said instantaneous part of said record,
  (e) circuit means for dividing said value of step (c) by said value of step (a) to establish a second signal representing the normalized across-trace absolute amplitude deviation of information at said instantaneous part of said record,
  (f) an electron beam oscilloscope including a screen and means for positioning said beam on said screen in accordance with signals applied to the horizontal and vertical deflection system thereof,
  (g) means for energizing said horizontal deflection system with said first signal, (h) means for energizing said vertical deflection system with said second signal,
(i) means blanking a selected portion of the screen of said oscilloscope,
(j) a photosensitive device responsive to the energization of said screen of said oscilloscope to produce an output signal,
(k) and means for designating parts of said record as containing meaningful signals when said beam of said oscilloscope is deflected to energize said screen in a portion thereof not blanked by said blanking means whereby said photosensitive device produces said output signal.

No references cited.

BENJAMIN A. BORCHELT, *Primary Examiner.*

R. M. SKOLNIK, *Assistant Examiner.*